United States Patent [19]

Morishita et al.

[11] Patent Number: 4,959,787
[45] Date of Patent: Sep. 25, 1990

[54] ELECTRIC POWER STEERING DEVICE HAVING A CLUTCH

[75] Inventors: Mitsuharu Morishita; Kosaku Uota; Takeshi Yasukawa, all of Himeji, Japan

[73] Assignee: Mitsubishi Denki Kabushiki Kaisha, Tokyo, Japan

[21] Appl. No.: 333,503

[22] Filed: Apr. 5, 1989

[30] Foreign Application Priority Data

Apr. 6, 1988 [JP] Japan .................................. 63-86121
Apr. 6, 1988 [JP] Japan .................................. 63-86122
Apr. 26, 1988 [JP] Japan ................................. 63-104706

[51] Int. Cl.⁵ .......................................... B62D 5/04
[52] U.S. Cl. ............................. 364/424.05; 180/79.1; 180/142
[58] Field of Search .................. 364/424.05; 180/79.1, 180/141, 142, 143

[56] References Cited

U.S. PATENT DOCUMENTS

| | | | |
|---|---|---|---|
| 4,573,545 | 5/1986 | Kalns ................... | 180/79.1 |
| 4,621,327 | 11/1986 | Dolph et al. ......... | 180/79.1 |
| 4,736,810 | 4/1988 | Morishita et al. ... | 180/79.1 |
| 4,798,253 | 1/1989 | Naito .................. | 180/79.1 |
| 4,799,566 | 1/1989 | Shimizu .............. | 180/79.1 |
| 4,881,611 | 11/1989 | Nakashima et al. ... | 180/79.1 |

Primary Examiner—Gary Chin
Attorney, Agent, or Firm—Sughrue, Mion, Zinn, Macpeak and Seas

[57] ABSTRACT

An electric power steering device having a clutch 25 for connecting and disconnecting the motor 14 to and from the steering shaft is disclosed, the control circuit of which comprises, in addition to a microcomputer 3, an additional analog direction determiner circuit 17, and a first and a second logical circuit. The first logical circuit consists of a pair of AND gates 20A, 20B generates a final right or left direction signal supplied to the motor driver circuit. The second logical circuit consists of a pair of exclusive OR gates 21A, 21B and an AND gate 22 and supplies a deenergization signal to the clutch driver when the directions determined by the microcomputer and the analog direction determiner circuit disagree. The direction determiner circuit includes: a first comparator 31 which outputs a right direction signal when the output voltage of the torque sensor exceeds a first reference level; and a second comparator 32 which outputs a left direction signal when the output voltage of the torque sensor is below a second reference level which is lower than the first level. These reference voltages, selected at upper and lower ends of the non-sensitive region, may be obtained by a voltage divider.

9 Claims, 7 Drawing Sheets

ELECTRIC POWER STEERING DEVICE HAVING A CLUTCH

BACKGROUND OF THE INVENTION

This invention relates to electric power steering devices for automobiles, and more particularly to a control circuit for electric power steering devices having a clutch for connecting and disconnecting the assisting electric motor to and from the steering shaft.

Automotive, vehicles generally comprise a steering wheel by means of which the operator of the vehicle maneuvers the course of the vehicle and turns it to the right or to the left; the torque applied by the operator on the steering wheel is transmitted, via a steering shaft, etc., to the steered wheels of the vehicle to turn the course of the vehicle to the right or to the left. To assist the operator of the vehicle in turning the steering wheel, most automotive vehicles today use power assist mechanisms. Among them, hydraulic power assist mechanisms have been most common. However, electric power steering devices, which utilize an electric motor for providing an auxiliary power to assist the operator of the vehicle, are now gaining an increasing acceptance; they promise to be more economical, lightweight, and reliable. Further, it is easy to use sophisticated electronic control circuitry in the case of electric power steering devices.

FIG. 1 shows a typical organization of the control circuitry for controlling the direction and magnitude of the torque of the electric motor of an electric power steering device. The circuitry comprises: a torque sensor 1 for detecting the torque applied by the operator of the vehicle; an electric motor 14, coupled to the steering shaft through a reduction gear, etc., for providing an auxiliary torque to assist the operator in turning the steering shaft; and a control circuit 16 which controls, in response to the steering torque detected by the torque sensor 1, the direction and the amount of the motor current supplied to the motor 14 so that a proper assisting torque may be provided by the motor 14.

The torque sensor 1 is coupled to the steering shaft (not shown) of the vehicle to sense the torque applied thereto by the operator of the vehicle via the steering wheel. FIG. 3 shows the relationship between the applied torque and the output of the torque sensor 1, wherein the steering torque T applied by the operator is plotted along the abscissa, while the output voltage V of the torque sensor 1 is plotted along the ordinate; the point $T_0$ on the abscissa corresponds to the neutral torque point at which the torque applied by the operator is null; the points on the abscissa to the right of point $T_0$ represent steering torques to turn the vehicle to the right; on the other hand, those points which are situated to the left of point $T_0$ represent steering torques to the left. The relationship between the steering torque T and the output voltage V is substantially linear as shown in FIG. 3: to the neutral or null torque point $T_0$ corresponds an output $V_0$; to left steering torques $T_1$ and $T_4$ correspond outputs $V_1$ and $V_4$, respectively; and to right steering torques $T_2$ and $T_3$ correspond outputs $V_2$ and $V_3$, respectively.

In response to the output V of the torque sensor 1, the control circuit 16 controls the output P of the electric motor 14 as illustrated in FIG. 4, wherein the output voltage V of the torque sensor 1 is plotted along the abscissa while the output P of the motor 14 is plotted along the ordinate.

When the output of the torque sensor 1 is in the region between $V_1$ and $V_2$, the output P of the motor remains null; namely, when the steering torque T applied by the operator is in the region between points $T_1$ and $T_2$ (see FIG. 3), no current is supplied to the motor 14 to energize it. Thus, the region of the steering torque T between the points $T_1$ and $T_2$, or the region of the sensor output V between the points $V_1$ and $V_2$ corresponding thereto, constitutes the non-sensitive region in which no assisting power is provided by the motor 14.

When the steering torque T in the right steering direction becomes greater than the level represented by point $T_2$, an auxiliary torque in the same steering direction is provided by the motor 14 in the following manner: after the steering torque T exceeds point $T_2$ to raise the output voltage V of the torque sensor 1 above the level $V_2$ (as shown in FIG. 3), the output P of the motor 14 is increased substantially linearly with respect to the sensor output V as shown in FIG. 4, until the steering torque T reaches point $T_3$ to raise the sensor output V to a saturation level $V_3$; after the right steering torque T exceeds point $T_3$, the motor output P is held at the constant level Pmax. Thus, between the points $T_2$ and $T_3$, an assisting torque to the right which is substantially proportional to the steering torque T is provided by the motor 14; above point $T_3$, the assisting torque provided by the motor 14 is saturated, i.e. is held at a predetermined maximum level Pmax.

When, on the other hand, the steering torque T in the left steering direction becomes greater than the level represented by point $T_1$ (i.e. when steering torque T is in the region to the left of the point $T_1$ in FIG. 3), an auxiliary torque in the same (i.e. left) steering direction is provided by the motor 14 in a manner symmetrical to the above case of right steering direction. Namely, when the magnitude of the left steering torque T increases from level $T_1$ to level $T_4$ (i.e. moves to the left from point $T_1$ to point $T_4$ on the abscissa in FIG. 3), the sensor output V decreases from $V_1$ to $V_4$; in the region between $V_1$ and $V_4$, the output P of the motor 14 is substantially linear to the sensor output V as shown in FIG. 4, so that an assisting torque substantially proportional to the steering torque T is provided by the motor 14 in this region; when the steering torque T is above the left saturation point $T_4$ corresponding to the sensor output $V_4$, the motor output P is held at the constant maximum level Pmax. Thus, the left linear control region between sensor outputs $V_1$ and $V_4$ corresponds to the right linear control region between sensor outputs $V_2$ and $V_3$; the left saturated control region below sensor output $V_4$ corresponds to the right saturated control region above sensor output $V_3$.

The output of the motor 14 is controlled in response to the output of the torque sensor 1 in the above manner by the control circuit 16. Referring again to FIG. 1, let us now describe the organization and method of operation of the control circuit 16, which comprises a torque signal interface circuit 2 coupled to the output of the torque sensor 1 through input terminals 15A and 15B of the control circuit 16, and a microcomputer 3 supplied with the torque signal (i.e. the output of the torque sensor 1) via the interface circuit 2. The microcomputer 3 determines the direction and the magnitude of the assisting torque which are to be provided by the motor 14, on the basis of the torque signal outputted from the sensor 1; namely, in response to the input signal from the torque signal interface circuit 2, which signal corresponds to the above output voltage V of the torque sensor 1, the microcomputer 3 determines the rotational direciton of the motor 14 corresponding to the steering torque T, and the output P of the motor 14 corresponding to the sensor output voltage V, on the basis of the relationships shown in FIGS. 3 and 4, respectively. The direction and the magnitude of the output torque of the motor 14 are controlled by the motor driver circuit 10 in accordance with these determinations of the microcomputer 3, as described in the following.

The right and the left direction signal from the microcomputer 3 are outputted to the motor driver circuit 10 through the right and left interface circuits 4 and 5, respectively. Namely, when the steering torque T is in the right steering direction and hence the sensor output voltage V is above the level $V_0$ corresponding to the neutral steering torque $T_0$, a right direction signal is outputted from the microcomputer 3 to the motor driver circuit 10 through the right direction signal interface 4; when, on the other hand, the steering torque T is in the left steering direction and hence the sensor output voltage V is below the level $V_0$, a left direction signal is outputted from the microcomputer 3 to the motor driver circuit 10 through the left direction signal interface 5.

On the other hand, the digital signal indicating the motor output torque P, which corresponds to the sensor output level V with respect to the relationship shown in FIG. 4, is outputted from the microcomputer 3 to the digital-to-analog converter 6, wherein it is converted into an analog signal indicating the motor output P; in response to this analog signal outputted from the digital-to-analog converter 6, a pulse width modulation circuitry (including an error amplifier 7, pulse width modulator 8, reference frequency oscillation circuit 9, a motor current detector circuit 11, and a motor current detecting resistor 12) generates pulses at a predetermined frequency whose pulse width varies in proportion to the magnitude of the motor output level P determined by the microcomputer 3. This pulse width modulation is effected in the following manner: Namely, the resistor 12 develops thereacross a voltage corresponding to the amount of the motor current supplied to the motor 14 from the motor driver circuit 10; the voltage developed at the output terminal of the detecting resistor 12 corresponding to the amount of the motor current is supplied to the motor current detector circuit 11, which in its turn outputs a signal corresponding to the amount of the motor current; the detecting circuit 11, however, limits its output under a predetermined level, or cuts off its output, when the voltage outputted from the resistor 12 exceeds a predetermined level. The error amplifier 7 compares the output of the digital-to-analog converter 6 and that of the motor current detector circuit 11, and amplifies the difference therebetween; namely, the amplifier 7 outputs a signal corresponding to the error of the motor current with respect to the motor output level P determined by the microcomputer 3. In response to the output of the amplifier 7, the pulse width modulator 8 modulates the width of the pulses outputted therefrom, on the basis of the output of the oscillation circuit 9 which oscillates at a predetermined frequency. The pulse width modulator 8 outputs a pulse train whose width varies substantially in proportion to the motor output level determined by the microcomputer 3.

In response to the pulse width modulated signal from the modulator 8 and a direction signal from the direction signal interface circuits 4 and 5, the motor driver circuit 10 supplies a current corresponding to these signals to the motor 14 through the output terminals 13A and 13B of the driver circuit 10: the direction of the current supplied from the driving circuit 10 to the motor 14 corresponds to the right or the left direction signal received from the interface circuit 4 or 5; the on-time thereof, on the other hand, corresponds to the duty factor of the pulse train outputted from the modulator 8. Namely, when a right direction signal is received from the interface circuit 4, the driver circuit 10 supplies the motor current in a direction wherein the motor 14 generates a torque to turn the steering shaft to the right, thereby assisting the turning operation of the operator of the vehicle to the right direction; when, on the other hand, a left direction signal is received from the interface 5, the driver circuit 10 supplies the motor current in the other direction wherein the motor 14 generates a torque to turn the steering shaft to the left. Further, the driver circuit 10 generally comprises switching power transistors which are turned on and off in response to the pulses outputted from the modulator 8, so that the on-time of the motor current corresponds to the pulse width of the pulses outputted from the modulator 8. Thus, the output of the motor 14 is controlled to the level determined by the microcomputer 3 on the basis of the output signal of the torque sensor 1.

No clutch mechanism is shown in FIG. 1; however, an electrical power steering device for automotive vehicles may comprise a clutch which connects and disconnects the output shaft of the electric motor 14 to and from the steering shaft. Thus, FIG. 2 shows an electromagnetic clutch 25 and a clutch driver circuit 23, in addition to the elements shown in FIG. 1. In the case of the power steering device shown in FIG. 2, an electromagnetic coil of the clutch 25 is energized by the current supplied from the clutch driver circuit 23 through output terminals 24A and 24B of the driver circuit 23, so that the clutch 25 connects the output shaft of the motor 14 to the steering shaft. The clutch driver circuit 23 supplies the energization current to the clutch 25 in response to the energization signal which is outputted from the microcomputer 3 when the key or ignition switch of the vehicle is turned on. Otherwise, the organization and method of operation of the circuit of FIG. 2 are identical to those of the circuit of FIG. 1, except that the torque signal interface circuit 2 shown in FIG. 1 is omitted from the representation of FIG. 2.

The power steering devices as described above, however, suffer from the following disadvantage. Namely, when the microcomputer 3 outputs a wrong direction signal, due to exterior noises, etc., the motor 14 is rotated in the wrong direction; if this happens, the motor acts against the intention of the operator of the vehicle by supplying a torque in a direction opposite to that of the torque applied by the operator; in the worst case, the operator may lose control over the course of the vehicle. Equally dangerous is the situation in which the motor 14 is oscillated due to the malfunctioning of the microcomputer 3.

SUMMARY OF THE INVENTION

It is a primary object of this invention therefore to provide an electric power steering device which is enhanced in safety and reliability; namely, the primary object of this invention is to provide an electric power steering device whose safety is not put in jeopardy even if the direction determining function of the microcomputer is lost due to exterior noises, etc.

It is an additional object of this invention to provide such a power steering device which is simple in organization and low in cost.

The above objects are accomplished in accordance with the principles of this invention in an electric power steering device including a duplicate direction determining system and a clutch disengaging system. Thus, the power steering device according to this invention comprises, in addition to a clutch and a microcomputer and other elements such as those shown in FIG. 2, an additional direction determiner circuit, and a first and a second logical circuit coupled to the microcomputer and the additional direction determiner circuit. The additional direction determiner circuit is coupled to the output of the torque sensor which detects the steering torque applied by the operator of the vehicle, and determines the direction of the auxiliary torque corresponding to the steering torque applied by the operator. The microcomputer also determines the direction of the auxiliary torque in response to the output of the torque sensor, as discussed above. The first logical circuit, which may consist of two AND gates, outputs a right or a left direction signal when the directions determined by the microcomputer and the direction determiner circuit agree to be the right or the left direction, respectively; the direction of the current supplied to the electric motor is determined on the basis of the direction signal outputted from the first logical circuit. The second logical circuit generates an output when the directions determined by the microcomputer and the direction determiner circuit are in disagreement; the clutch connecting and disconnecting the motor to and from the steering shaft is disengaged in response to the output of the second logical circuit. The second logical circuit may consist of a first exclusive OR circuit coupled to right direction signal outputs of the microcomputer and the direction determiner circuit, a second exlusive OR circuit coupled to left direction signal outputs of the microcomputer and the direction determiner circuit, and an AND gate coupled to the outputs of these exclusive OR gates. When the directions determined by the microcomputer and the direction determiner circuit are in disagreement, the motor is not energized and, in addition, the clutch is disengaged to disconnect the motor from the steering shaft; the safety and reliability are therefore extremely enchanced.

In a preferred form, the torque sensor outputs a voltage signal which is substantially in a linear relationship with the steering torque applied by the operator of the vehicle (as shown in FIG. 3); further, the direction determiner circuit compares the torque sensor output voltage with a first and a second (lower) reference voltage level and generates a (right or left) direction signal when the torque sensor output voltage is above the first, or below the second, reference voltage. When the voltage level of the torque signal outputted from the torque sensor is between the first and second reference voltages, neither right nor left direction signal is outputted from the direction determiner circuit and the electric motor is therefore not energized; thus, so long as the output voltage of the torque sensor is between the two reference voltages, there is no chance of driving the motor in the wrong direction. Hence, the safety of the device can further be enhanced by selecting the first and second reference voltage levels at the upper and lower end points (e.g. the points $V_2$ and $V_1$ in FIGS. 3 and 4) of the non-sensitive region of the torque sensor output in which the motor output determined by the microcomputer is null (as illustrated in FIG. 4).

It is a feature of this invention that a differentiating circuit is inserted between the output of the torque sensor and the microcomputer so that the control response speed can be enchanced; the direction determiner circuit may also be supplied with the output of the differentiating circuit. Further, the torque sensor may output two independent signals each of which corresponds to the steering torque applied by the operator of the vehicle; one output signal of the torque sensor is supplied to the microcomputer (via the differentiating circuit if it is inserted), while the other is supplied to the direction determination circuit; the adverse effects of the noises which may be contained in the output signals of the torque sensor are thereby minimized to improve the safety and reliability further.

BRIEF DESCRIPTION OF THE DRAWINGS

The novel features which are believed to be characteristic of our invention are set forth with particularity in the appended claims. Our invention itself, however both as to its organization and method of operation, may best be understood by reference to the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENTS

Figure 5:
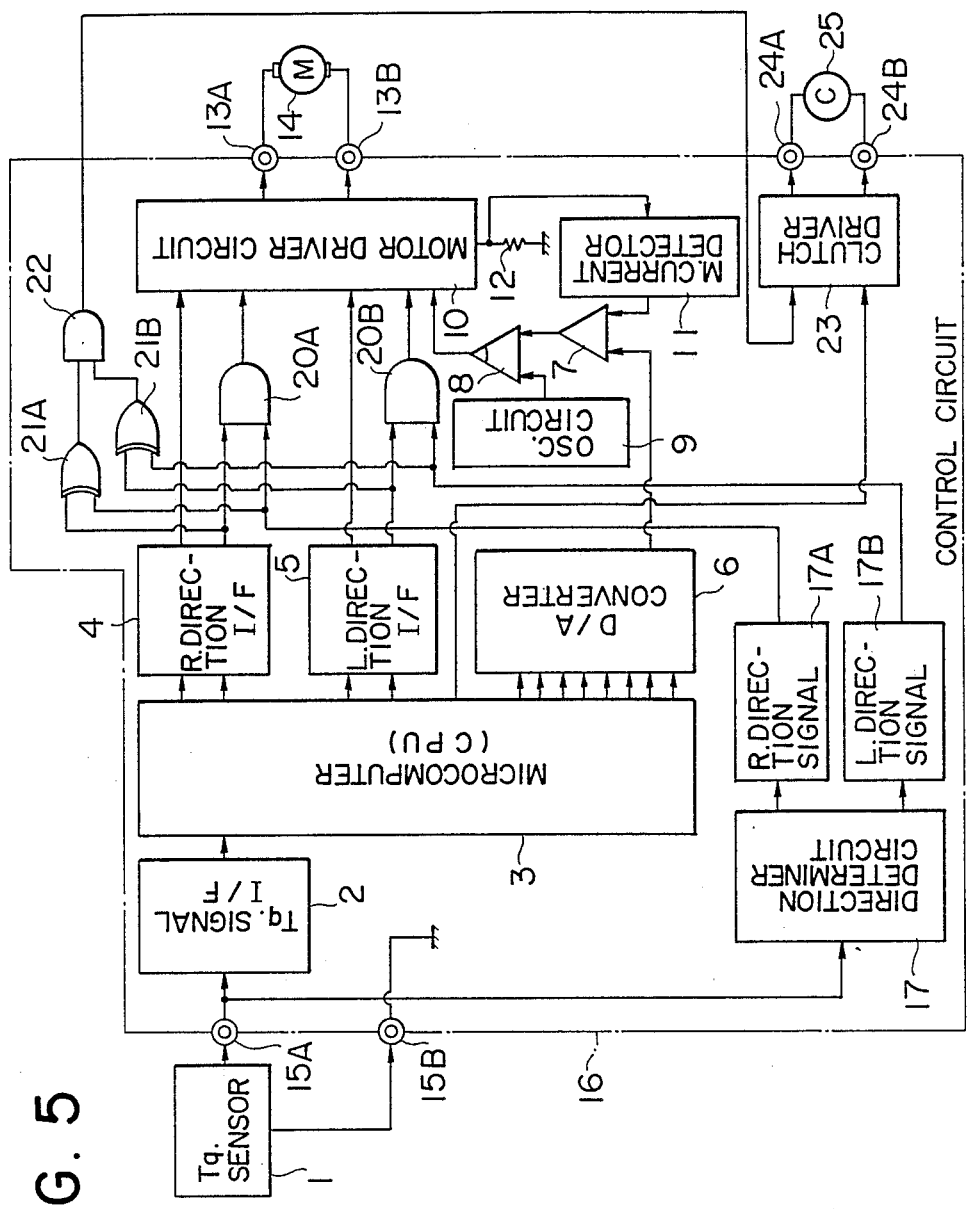
FIGS. 5, 7 and 8 are block diagrams similar to those of FIGS. 1 and 2, but showing power steering devices according to this invention.
Figure 6:
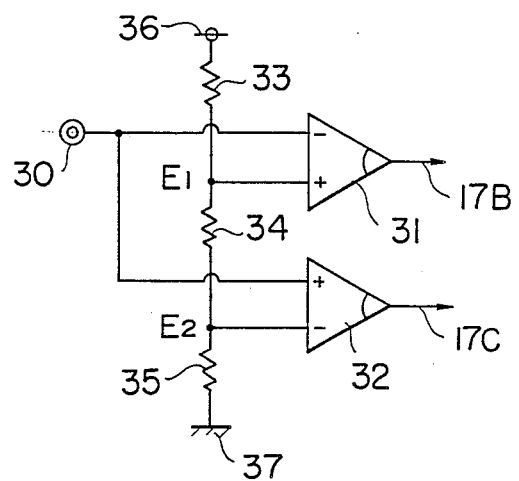
FIG. 6 is a circuit diagram of the direction determiner circuit comprised in the devices of FIGS. 5, 7, and 8.

Referring now to FIGS. 5 and 6 of the drawings, a first embodiment of this invention is described.

Figure 2:
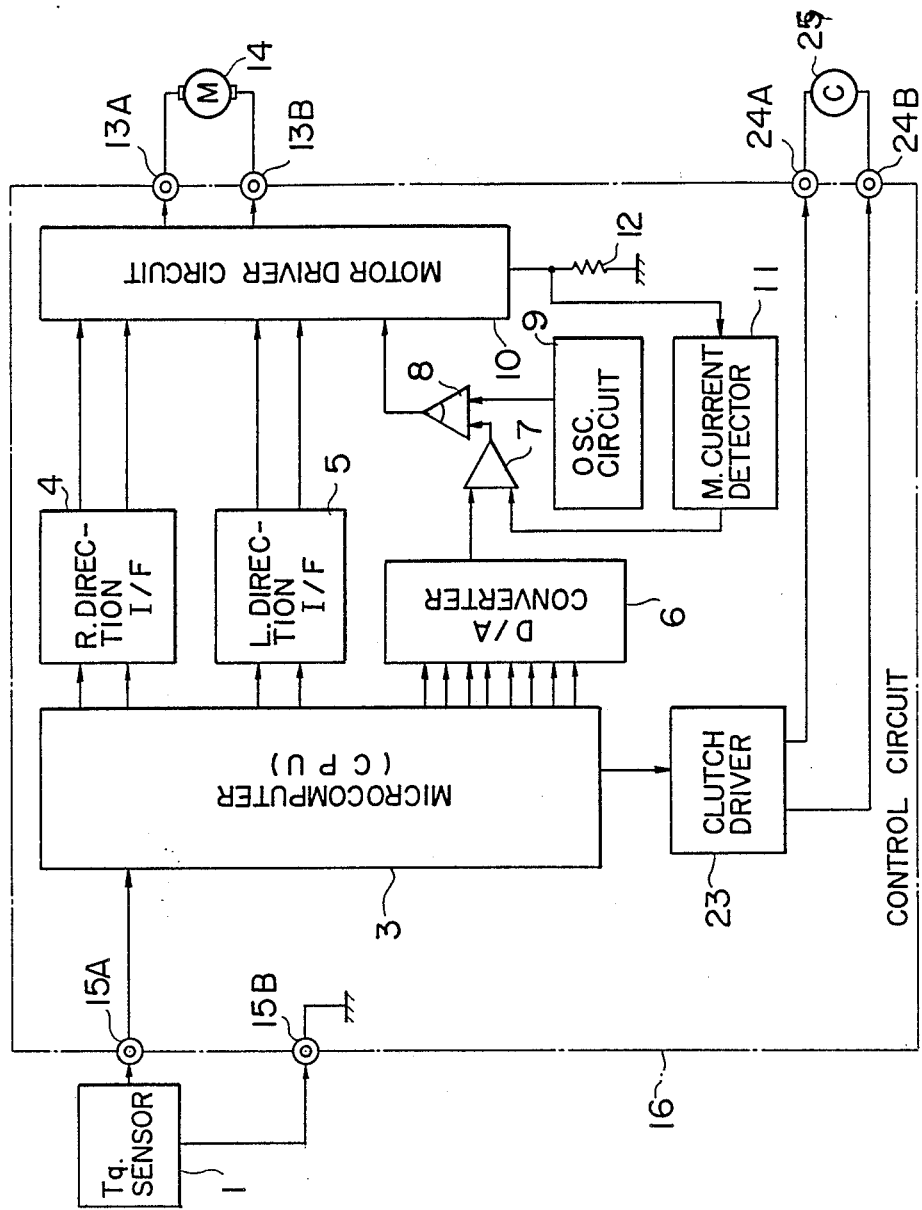

FIG. 5 shows the overall organization of the electric power steering device according to the first embodiment of this invention. The device comprises an electric motor 14, a torque sensor 1, an electromagnetic clutch 25, and a control circuit 16, all of which are similar to the corresponding portions of the device of FIG. 2, except that the control circuit 16 of FIG. 5 comprises a direction determiner circuit 17, and a first and a second logical circuit. The first logical circuit consists of a pair of AND gates 20A and 20B, and constitutes a fail-safe direction determination system; the second logical circuit consists of a pair of exclusive OR gates 21A and 21B and an AND gate 22, and generates an outut signal for disengaging the clutch 25 to disconnect the motor 14 from the steering shaft. Portions other than these have an organization and method of operation identical to those of the corresponding portions of the device of FIG. 2, wherein corresponding portions are designated by the same reference numerals in both figures. Thus, in the following, only those portions which are charactristic of this invention are described, and the description of the portions which are identical to the corresponding portions of FIG. 2 is omitted for the most part.

Figure 3:
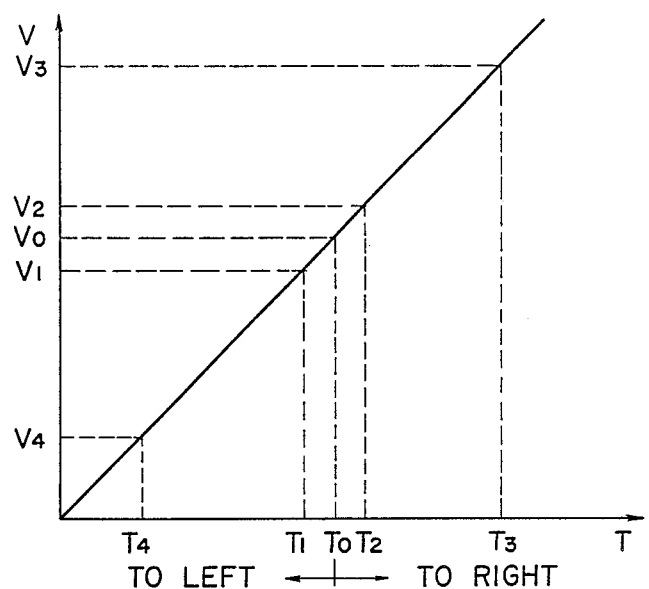
FIG. 3 shows the relationship between the steering torque applied by the operator of the vehicle and the output voltage of the torque sensor.
Figure 4:
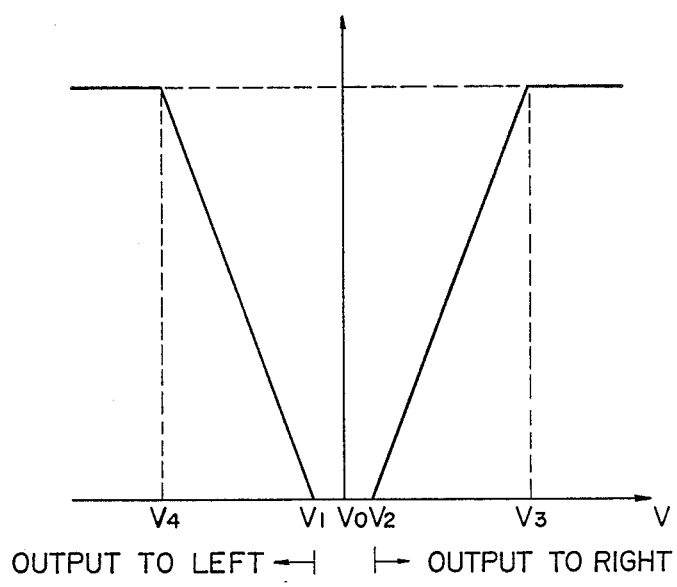
FIG. 4 shows the relationship between the output voltage of the torque sensor and the output of the electric motor of an electric power steering device.

In FIG. 5 the analog direction determiner circuit 17 is coupled to the output of the torque sensor 1 and receives the same torque signal as the torque signal interface circuit 2. As described above, the voltage level V of the torque signal outputted from the torque sensor 1 is in linear relationship with the steering torque T applied by the operator of the vehicle, which relationship is shown in FIG. 3. The analog direction determiner circuit 17 outputs a second or supplementary right direction signal 17a when the torque signal voltage level V is greater than a first predetermined reference voltage level $E_1$; this first reference voltage level $E_1$ is preferred to be selected at $V_2$ corresponding to the right assist starting steering torque $T_2$; however, it may be at any level between the sensor output voltage levels $V_0$ and $V_2$ which correspond to the neutral or null torque level $T_0$ and the assist starting torque point $T_2$, respectively (see FIGS. 3 and 4). On the other hand, the analog direction determiner circuit 17 outputs a second or supplementary left direction signal 17b when the voltage level V is lower than a second predetermined reference voltage level $E_2$; this second reference voltage level $E_2$ is preferred to be selected at the sensor output voltage level $V_1$ corresponding to the left assist starting steering torque $T_1$; however, it may be at any level between the sensor output voltage levels $V_0$ and $V_1$ which correspond to the neutral torque point $T_0$ and the left assist starting torque point $T_1$, respectively.

So long as the torque signal voltage V is between the two reference voltages $E_1$ and $E_2$, the direction determiner circuit 17 outputs neither right nor left direction signal and hence the motor 14 is not supplied with a current (as described below). Thus, the safety and reliability of the power steering device according to this invention can be maximized by selecting the first and second reference voltages $E_1$ and $E_2$ at the upper and lower end points $V_2$ and $V_1$, respectively, of the nonsensitve region of the signal voltage level in which the motor 14 is not energized according to the relationship shown in FIG. 4.

FIG. 6 shows an example of the implementation of the analog direction determiner circuit 17. Input terminal 30 of determiner circuit 17 is coupled to the output terminal of torque sensor 1 through the terminal 15A of the control circuit 16, to receive the voltage V of the torque signal. A voltage divider consisting of a first, a second, and a third resistor, 33 through 35, is coupled across a constant positive voltage source 36 and the ground 37, to provide a first and a second reference voltage $E_1$ and $E_2$ at the junction point between the first and second resistors 33 and 34 and the junction point between the second and third resistors 34 and 35, respectively. A first comparator circuit 31, which has an inverting and a non-inverting input terminal coupled to the terminal 30 and the junction between first and second resistors 33 and 34, respectively, compares the torque signal voltage level V with the reference voltage $E_1$, and outputs the above second right direction signal 17a when the voltage level V exceeds the reference voltage level $E_1$. On the other hand, a second comparator circuit 32, which has a non-inverting and an inverting input terminal coupled to the terminal 30 and the junction between second and third resistors 34 and 35, respectively, compares the torque signal voltage level V with the reference voltage $E_2$, and outputs the above second left direction signal 17b when the voltage level V is below the reference voltage level $E_2$.

Referring again to FIG. 5, let us describe the first logical circuit constituting the fail-safe direction determining system.

The first AND gate 20A performs an AND operation on the two right direction signals: the first right direction signal outputted from the microcomputer 3 through the right direction signal interface circuit 4 and the second right direction signal 17a outputted from the analog direction determiner circuit 17. Namely, the first AND gate 20A has a first and a second input coupled to the interface circuit 4 and the right direction signal output of direction determiner circuit 17, respectively, and outputs a final right direction signal (which is used by the motor driver circuit 10 in determining the direction of current supplied to the motor 14), if and only if both the first and second right direction signals are received.

The second AND gate 20B, on the other hand, performs an AND operation on the two left direction signals: the first left direction signal outputted from the microcomputer 3 through the left direction signal interface circuit 5 and the second left direction signal 17a outputted from the analog direction determiner circuit 17. Namely, the second AND gate 20B has a first and a second input coupled to the interface circuit 5 and the left direction signal output of direction determiner circuit 17, respectively, and outputs a final left direction signal (used by the motor driver circuit 10), if and only if both the first and second left direction signals are received.

Figure 1:
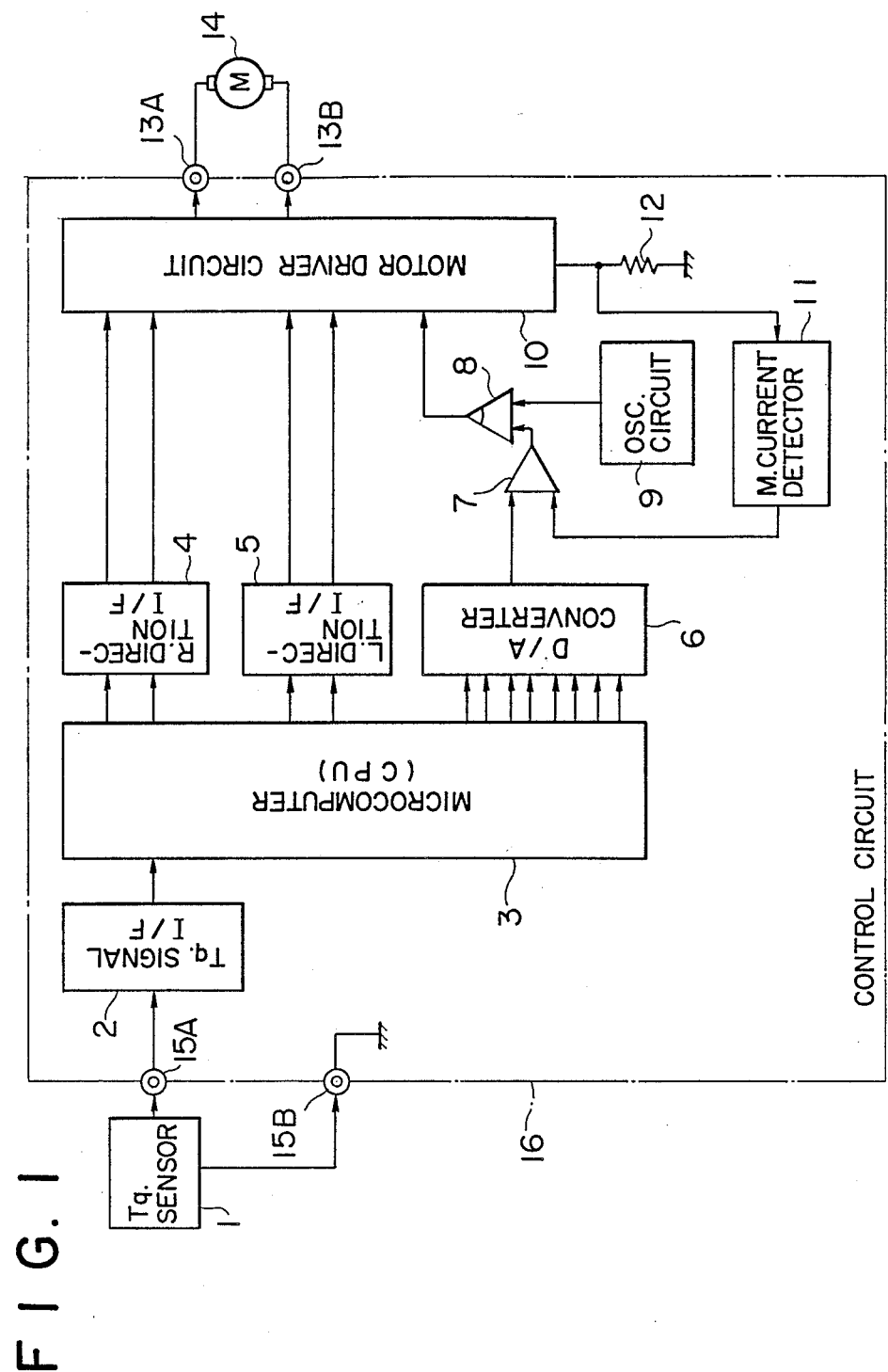
FIGS. 1 and 2 are block diagrams of electric power steering devices which are related to the device according to this invention.

The amount of current supplied from the motor driver circuit 10 to the motor 14 is controlled by the pulse width modulated signal outputted from the pulse width modulator 8. This control of the amount (or on-time) of the motor current is effected in a manner identical to the case of FIG. 1 discussed above. On the other hand, the direction of the current supplied from the motor driver circuit 10 to the motor 14 is determined in response to the outputs of the first and second AND gates 20A and 20B: when the right direction signal is received from the first AND gate 20A, the driver circuit 10 supplies a current to the motor 14 in a direction wherein the motor 14 provides an auxiliary turning torque to the right to the steering shaft; when, on the other hand, a left direction signal is received from the second AND gate 20B, the driver circuit 10 supplies a current to the motor 14 in the other direction wherein the motor 14 provides an auxiliary turning torque to the left to the steering shaft. In the case where neither the first AND gate 20A nor the second AND gate 20B generates an output signal, no current is supplied from the driver circuit 10 to the motor 14.

As described above, the determination of the direction is effected in a duplicate fail-safe manner: a first determination of the direction is effected by the microcomputer 3 by means of a digital computation to generate a first right and a first left direction signal; a second determination is effected by the direction determiner circuit 17 by means of an analog computation to generate a second right and a second left direction signal; the final direction signals are obtained by performing an AND operation on the first and second right direction signals and on the first and second left direction signals, respectively, by the AND gates 20A and 20B.

Let us now turn to the description of the second logical circuit for generating an output for disengaging the clutch.

The first exlusive OR gate 21A performs an OR operaton on the two right direction signals: the first right direction signal outputted from the microcomputer 3 through the right direction signal interface circuit 4 and the second right direction signal 17A outputted from the analog direction determiner circuit 17. Namely, the first OR gate 21A has a first and a second input coupled to the interface circuit 4 and the right direction signal output of direction determiner circuit 17, respectively, and generates an output when only one of the first and second right direction signals is received.

The second exlusive OR gate 21B performs an OR operaton on the two left direction signals: the first left direction signal outputted from the microcomputer 3 through the left direction signal interface circuit 5 and the second left direction signal 17B outputted from the analog direction determiner circuit 17. Namely, the second OR gate 21B has a first and a second input coupled to the interface circuit 5 and the left direction signal output of direction determiner circuit 17, respectively, and generates an output when only one of the first and second left direction signals is received.

An AND gate 22 has a pair of inputs coupled to the outputs of the exclusive OR gates 21A and 21B and performs an AND operation on the outputs of the two gates 21A and 21B. Thus, the AND gate generates an output if and only if the direction determination by the microcomputer 3 and that by the circuit 17 are in disagreement.

The clutch driver circuit 23, which energizes the clutch 25 to connect the motor 14 to the steering shaft in response to an energization signal from the microcomputer 3, disengages the clutch 25 to disconnect the motor 14 from the steering shaft in response to an output signal from the AND gate 22. Thus, when either the microcomputer 3 or the direction determiner circuit 17 is malfunctioning, the motor 14 is separated from the steering shaft, so that even if the motor 14 is energized, the torque of the motor is not transmitted to the steering shaft.

Figure 7:
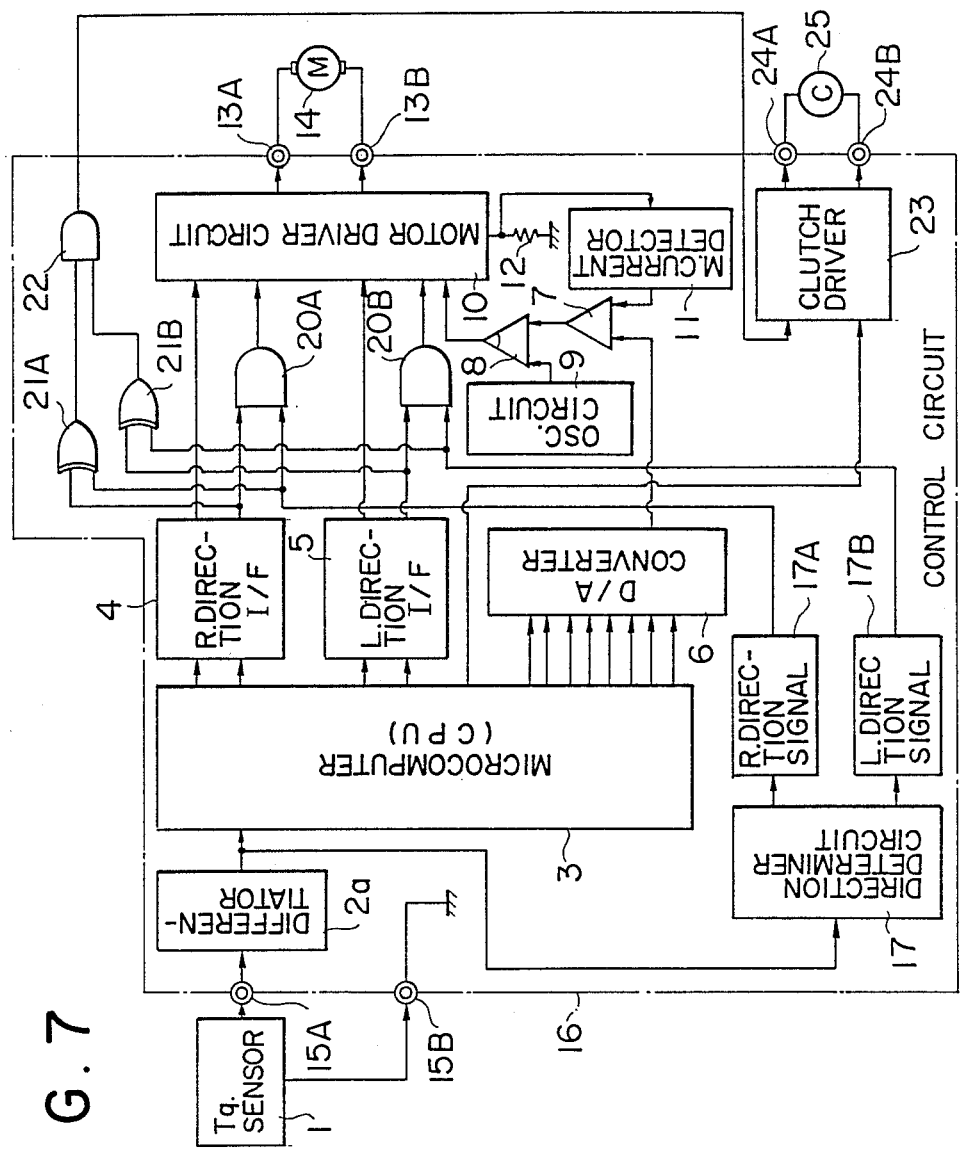

Referring now to FIG. 7 of the drawings, a second embodiment is described. The power steering device of FIG. 7 is identical in organization and method of operation to the device of FIG. 5, except that a differentiating circuit 2a is inserted between the output of torque sensor 1 and the input of microcomputer 3 so that the microcomputer 3 is supplied with the output of the differentiating circuit 2a; the direction determiner circuit 17 may also be supplied with an output of the differentiating circuit 2a. The differentiating circuit 2a generates an output signal which is proportional to the differential of the torque signal of the torque sensor 1 with respect to time. Thus, the speed of response of the microcomputer 3 and the direction determiner circuit 17 can be enhanced by the insertion of the differentiating circuit 2a.

Figure 8:
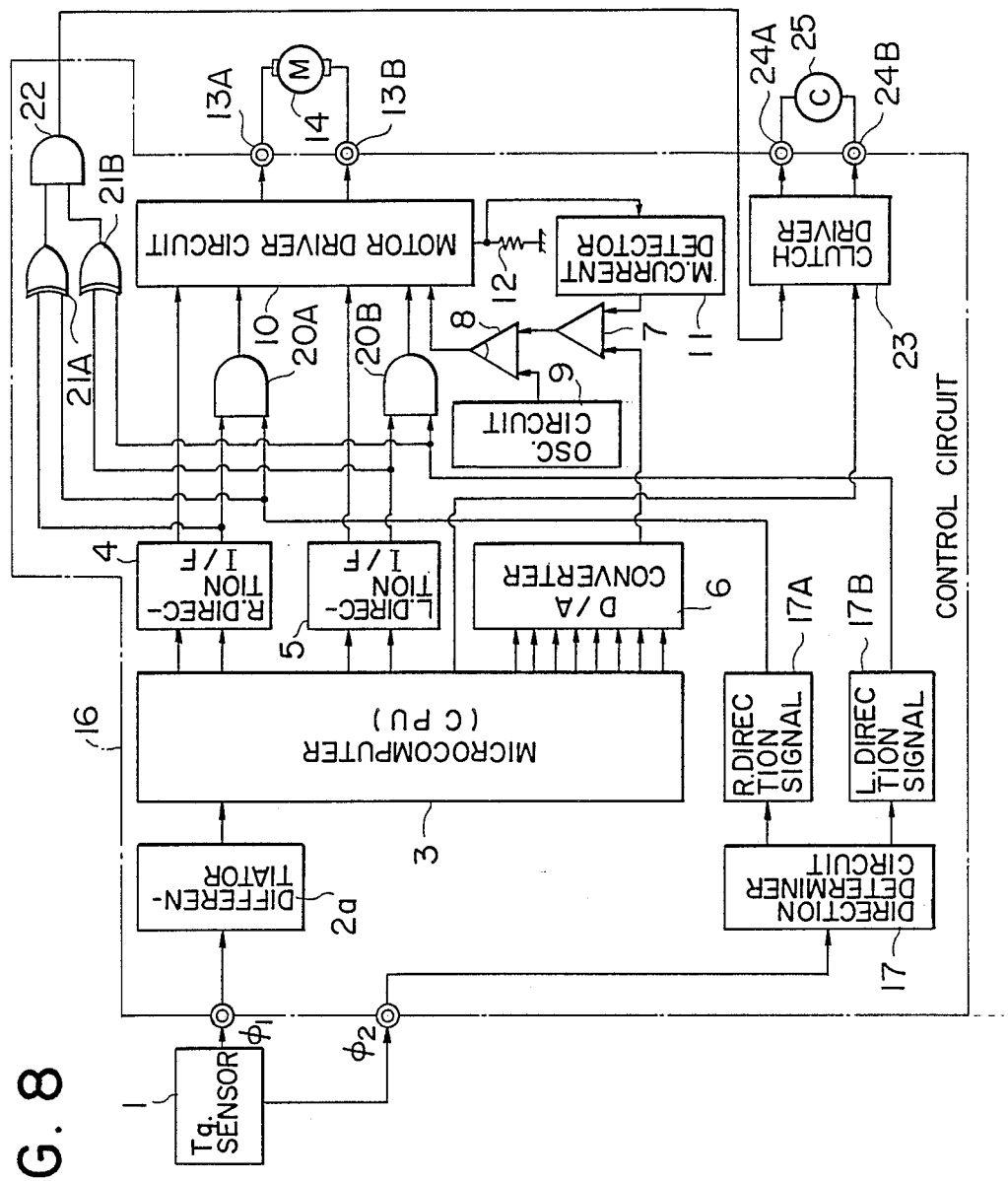

Next, referring to FIG. 8 of the drawings, a third embodiment of this invention is described. As shown in FIG. 8, the device according to the third embodiment is identical to that according to the above first embodiment, except for the following points: the torque sensor 1 outputs, instead of a single torque signal, two independent torque signals $\phi_1$ and $\phi_2$, which are delivered to the microcomputer 3 via a differentiating circuit 2a and to the analog direction determiner circuit 17, respectively. Thus, not only the adverse effects of the noises which may be contained in the torque signals outputted from the torque sensor 1 are minimized, to reduce further the chance of wrong direction determination, but also the speed of response of the microcomputer 3 in determining the direction and amount of the auxiliary torque provided by the motor 14 can be enhanced.

While we have described and shown the particular embodiments of our invention, it will be understood that many modifications may be made without departing from the spirit thereof; we contemplate by the appended claims to cover any such modifications as fall within the true spirit and scope of our invention.

What is claimed is:

1. An electric motor assisted power steering device for an automotive vehicle which includes a steering wheel operated by an operator of the vehicle, at least one steered wheel, and a steering shaft operatively coupling the steering wheel to the steered wheel, said power steering device comprising:

an electric motor rotatable in first and second directions by a supply of a current in said first and second directions, wherein said electric motor provides an auxiliary torque to the steering shaft in right and left directions by rotating in said first and second directions, respectively;

clutch means for connecting and disconnecting said electric motor to and from the steering shaft;

torque sensor means for detecting a steering torque of the steering shaft applied by the operator of the vehicle via the steering wheel;

computation means, including a microcomputer coupled to an output of said torque sensor, for determining a direction of said auxiliary torque corresponding to said steering torque of the steering shaft applied by the operator, and for determining an amount of the auxiliary torque which is to be provided by said electric motor to the steering shaft;

direction determiner circuit means, coupled to an output of said torque sensor means, for determining a direction of said auxiliary torque corresponding to said steering torque of the steering shaft applied by the operator;

first logical circuit means, coupled to outputs of said computation means and said direction determiner circuit means, for generating a right direction signal when the directions determined by said computation means and said direction determiner circuit means are both the right direction, and generating a left direction signal when both are the left direction;

second logical circuit means, coupled to said outputs of said computation means and said direction determiner circuit means, for generating an output signal when the directions determined by said computation means and said direction determiner circuit means are in disagreement;

motor current control means, coupled to an output of said first logical circuit means, for controlling a current supplied to said electric motor to an amount corresponding to said amount of auxiliary torque determined by said computation means, wherein said motor current control means controls a direction of current supplied to said electric motor to said first direction in response to said right direction signal and to said second direction in response to said left direction signal; and clutch driver means, coupled to an output of said second logical circuit means, for disengaging said clutch means to disconnect said electric motor from said steering shaft, in response to said output signal of said second logical circuit means.

2. An electric motor assisted power steering device as claimed in claim 1, wherein:

said computation means and said direction determiner circuit means output said right and left direction signals in accordance with the determined directions thereof, respectively:

said first logical circuit means comprises first AND gate means for performing an AND operation on said right direction signal outputs of said computation means and said direction determiner circuit means, and second AND gate means for performing an AND operation on said left direction signal outputs of said computation means and said direction determiner circuit means, outputs of said first and second AND gate means constituting said right and left direction signals of the first logical circuit means, respectively;

said second logical circuit means comprises first exclusive OR gate means for performing an exclusive OR operation on said right direction signal outputs of said computation means and said direction determiner circuit means, second exclusive OR gate means for performing an exclusive OR operation on said left direction signal outputs of said computation means and said direction determiner circuit means, and third AND gate means for performing an AND operation on outputs of said first and second exclusive OR gate means, an output of said third AND gate means constituting the output signal of the second logical circuit means.

3. An electric motor assisted power steering device as claimed in claim 2, wherein:

said torque sensor means outputs a voltage signal having a level which varies substantially in linear relationship with said steering torque of the steering shaft; and said direction determiner circuit means comprises an analog circuit which includes: first comparator means for comparing said level of the voltage signal of said torque sensor means with a first reference voltage level, said first comparator means outputting a signal when said level of the voltage signal exceeds said first reference voltage level; and second comparator means for comparing said level of the voltage signal of said torque sensor means with a second reference voltage level which is lower than said first reference voltage level, said second comparator means outputting a signal when said level of the voltage signal is below said second reference voltage level; wherein the output signals of said first and second comparator means constitute said right and left direction signals outputted from said direction determiner circuit means.

4. An electric motor assisted type power steering device as claimed in claim 3, wherein said first and second reference voltages are selected at upper and lower end points, respectively, of a nonsensitive region of the voltage signal of said torque sensor means in which said electric motor is not to be supplied with a current from said motor current control means.

5. An electric motor assisted power steering device as claimed in claim 3, wherein said direction determiner circuit means further comprises a voltage divider comprising a serial connection of a first, a second, and a third resistor coupled across a constant voltage source and a ground voltage, a junction point between said first and second resistors outputting said first reference voltage level and a junction point between said second and third resistors outputting said second reference voltage level, said first comparator means having a first input coupled to said output of said torque sensor means and a second input coupled to said junction point between said first and second resistors of said voltage divider, and said second comparator means having a first input coupled to said output of said torque sensor means and a second input coupled to said junction point between said second and third resistors of said voltage divider.

6. An electric motor assisted power steering device as claimed in claim 1, further comprising a differentiating circuit means, inserted between said output of said torque sensor means and said computation means, for outputting a differentiated signal of said output of said torque sensor means, wherein said computation means determines the direction and amount of said auxiliary torque in response to said differentiated signal of said differentiating circuit.

7. An electric motor assisted power steering device as claimed in any one of claims 1 through 5, wherein said torque sensor means outputs a first and a second output signal each corresponding to the detected steering torque, said first output signal being supplied to said computation means and said second output signal being supplied to said direction determiner circuit means.

8. An electric motor assisted power steering device as claimed in claim 6, wherein said torque sensor means outputs a first and a second output signal each corresponding to the detected steering torque, said first output signal being supplied to said differentiating circuit means to be supplied therefrom to said computation means, and said second output signal being supplied to said direction determiner circuit means.

9. An electric motor assisted power steering device as claimed in claim 6, wherein said direction determiner circuit means is supplied with said differentiated signal of said differentiating circuit means.

* * * * *